Nov. 29, 1949  A. F. SCHRAMM, JR  2,489,466
METHOD OF MAKING STIFFENED
PERMEABLE SHEET MATERIAL
Filed April 25, 1946

INVENTOR.
August F. Schramm, Jr.
BY
Alan M. Mann
ATTORNEY

Patented Nov. 29, 1949

2,489,466

UNITED STATES PATENT OFFICE 2,489,466

METHOD OF MAKING STIFFENED PERMEABLE SHEET MATERIAL

August F. Schramm, Jr., White Plains, N. Y.

Application April 25, 1946, Serial No. 664,789

2 Claims. (Cl. 117—21)

This invention relates to a stiffened but water permeable fibrous sheet material and the method of making it. More particularly the invention relates to such an article of manufacture containing fabric or like fibrous sheet and spaced minute particles or masses of thermoplastic material containing a plasticizer therefor that improves the flexibility and lowers the softening point of the thermoplastic material to a temperature below that of scorching of the sheet, so that the article may be smoothed by ironing.

In U. S. Patent 2,035,766, entitled "Articles of apparel and method of making the same" and issued to me on March 31, 1936, there is described soaking a lining such as the stiffening fabric for a collar with a volatile solvent, applying powdered plastic material upon the solvent soaked lining, and then evaporating the solvent and pressing the product between warmed rollers. This process gives a stiffened sheet characterized by open interstices between the particles of plastic so that the completed article is permeable to perspiration, water and air.

I have now discovered an improved process and product which eliminate the need of volatile solvent, prevent possible better control in manufacturing, prevent migration of the plastic from the position in which the particles of it are first anchored to the sheet material, and insure that the plastic in the finished product will remain permanently pliable and be sufficiently yieldable at ironing temperatures that the article will be properly smoothed during this operation.

Briefly stated, the invention comprises treating a water permeable flexible fibrous sheet with a substantially non-volatile plasticizer in proportion less than that required to saturate the sheet, applying over the plasticizer-treated sheet a finely divided thermoplastic material that is soluble in the plasticizer, removing that part of the applied thermoplastic material that fails to contact the plasticizer-treated sheet, warming the article including the sheet, plasticizer and adhered particles of thermoplastic, and preferably applying pressure as by a smoothing surface to the warmed article so that the softened thermoplastic material is smoothed somewhat over its exposed surface and forced in part into the surface portions of the base sheet.

The invention includes also the product of the method, namely, a flexible although stiffened sheet containing the thermoplastic material in established localized positions, the sheet material between said positions retaining permeability to liquids and gases and particularly to water.

The application of the plasticizer to the sheet ensures a high proportion of plasticizer initially to that part of the plastic in direct contact with the sheet at the time of anchoring the plastic, when the maximum of softness of plastic in contact with the sheet is desirable. It will be understood also that, when volatile solvent is used in accordance with prior practice, it is later evaporated from some surface. As evaporation proceeds, solvent in the less exposed places moves to a surface, to replace that evaporated. As the solvent migrates to the point at which evaporation occurs, it may carry substantial amounts of dissolved material with it and deposit the material where the solvent evaporates. The replacement of volatile solvent by a limited amount of plasticizer, that is substantially non-volatile and is usually very viscous as compared to the relatively thin volatile solvents, avoids objectionable migration and spreading of the plastic from the localized spots in which it is initially anchored by my process. Furthermore, the use of plasticizer causes a permanent lowering of the softening temperature of the thermoplastic material and thus promotes smoothing of the thermoplastic during such operations as ironing at elevated temperatures. The use of the plasticizer prevents also separation of the plastic, that by itself is brittle, from the sheet when the article is flexed.

The invention will be further illustrated by description in connection with the attached drawing to which reference is made.

Figure 1:
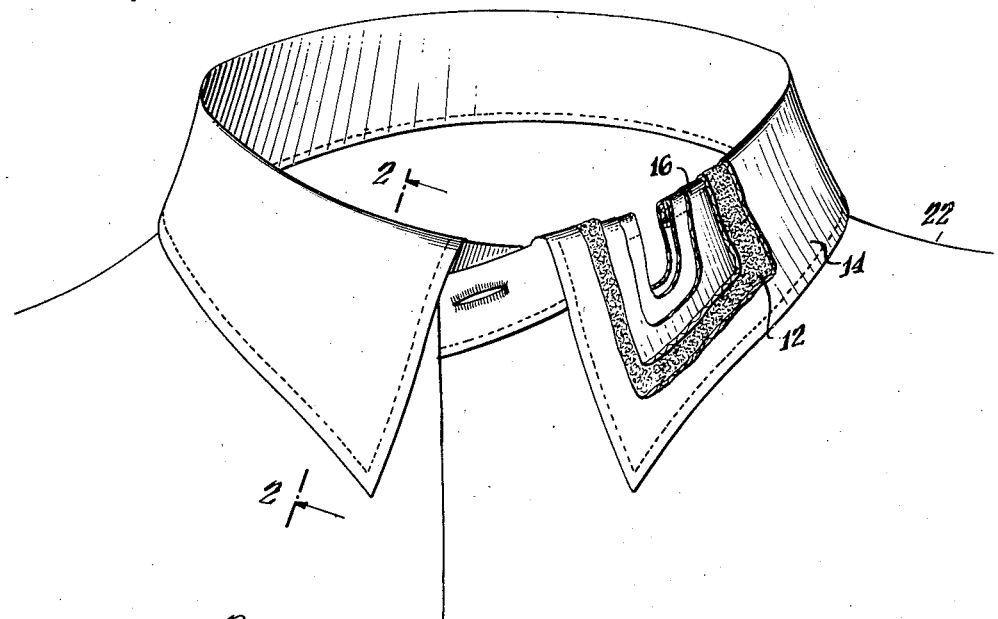
Fig. 1 is a perspective view of a collar utilizing my improved liner, with parts of the collar broken away for better illustration.
Figure 2:
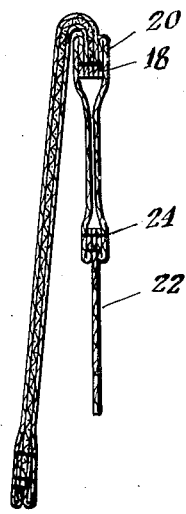
Fig. 2 is a sectional view on line 2—2 of Fig. 1.
Figure 3:
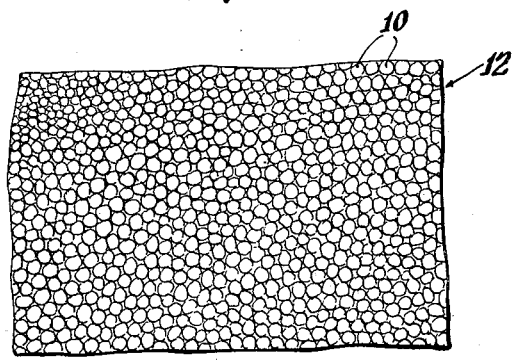
Fig. 3 is a magnified plan view of the surface of a fibrous sheet material treated in accordance with my invention, the figure being in part diagrammatic.

There are shown spaced masses 10 of thermoplastic material, that may contact each other but define interstices therebetween, anchored upon a permeable sheet material indicated generally at 12. In the construction shown in Fig. 1 such sheet material with the applied particles of thermoplastic constitutes the liner between the outer ply 14 and the inner ply 16 of a man's collar secured as by stitching 18 within the neck band 20 attached to shirt 22 by stitching 24, details not shown being conventional.

As the permeable sheet material selected there is used to advantage a textile fabric of which an ordinary cloth is an example, leather, paper, felt, or like permeable flexible fibrous sheet. When a textile is used, it may be woven, braided or knitted and may contain inner strips of rubber as in the fabric known by the trade name Lastex.

The thermoplastic used should be one that is without deteriorating effect upon the selected fibrous sheet and for most purposes should be one of unobjectionable color. Examples of plastics that illustrate the class of materials that may be used to advantage are the vinyl resins, cellulose acetate, and methacrylate and polystyrene resins. The grade selected is one that is solid at ordinary temperatures and, when plasticized as described, is flexible at atmospheric temperatures and at least moderately yieldable at temperatures between 200° and 250° F. corresponding approximately to usual ironing temperatures. Particles of these thermoplastic materials are known, and also are shown by the method of application described below, to be non-adherent to each other when in non-plasticized condition and at room temperatures. For the sake of safety in connection with the most common uses of my invention, the plastic selected should be non-toxic on the skin and non-inflammable or at least not rapidly combustible.

The plasticizer used is one that is known to be a substantially non-volatile solvent for the particular plastic selected, non-toxic on the skin, and without substantial deteriorating effect upon cellulose fibers or other fibrous material to which the plasticizer is applied in the process and product of the present invention. When the thermoplastic material selected is a vinyl resin, as, for instance, polymerized vinyl chloracetate of resinous consistency known by the trade name VNYW, the plasticizer is suitably dibutoxyethyl phthalate used either alone or mixed with diethyleneglycol dipropionate. With the methacrylate resins, say methyl methacrylate, the plasticizer used may be one of the non-volatile esters such as dibutyl or diamyl phthalate that are solvents for the methacrylate. When cellulose acetate or cellulose acetate butyrate is the thermoplastic chosen, then the plasticizer may be dimethylphthalate or dimethoxy methyl phthalate.

The particles of thermoplastic material that are applied over the plasticizer-treated fibrous sheet must be small in size so as not to deface finally the surface of the sheet and give a pebbly appearance. For this reason I use to advantage a finely divided thermoplastic of the fineness of a powder. While the mesh size may be varied considerably, I prefer to use a material that will pass substantially completely through a 150 mesh screen, although other suitable sizes are those corresponding to finely divided material passing in predominating proportion of the total weight through 50 to 325 mesh screens.

In general, my method includes moistening a surface of the selected fibrous sheet with a limited proportion of the plasticizer that is substantially less than the saturation quantity, applying thereover the powdered thermoplastic, removing that part of the thermoplastic material that is not in actual contact with the plasticizer and, therefore, not adhered to the fibrous sheet, and then applying heat and pressure. The heat and pressure cause dispersion of plasticizer within the retained thermoplastic material and anchorage of the thus plasticized plastic upon the fibrous sheet. When pressed warm by a suitably shaped ironing or embossing member, the treated sheet is given the desired smoothness or embossing.

The invention will be further illustrated by description in connection with the following specific examples of the practice of it.

*Application of plasticizer and plastic to sheet*

A cloth which is to constitute the inner, stiffening member of a man's collar is passed between guide rollers, a mixture of three parts of dibutoxy ethyl phthalate and one part of diethylene glycol dipropionate by weight is then sprayed lightly upon the surface in amount to moisten the entire area of one surface of the face of the fabric. There is then spread upon this moistened surface, as by sifting, a layer of powdered vinyl resin VNYW described above.

The cloth is then inverted, so that the layer of applied resin is on the lower surface, and is lightly tapped on the back of the fabric so that the resin which is not in direct contact with the plasticizer-treated fabric is caused to drop off. This leaves particles of the vinyl resin at positions about as close together as the particles in direct contact with the plasticizer on the fibrous sheet permit each other to rest. The spaces between these particles are extremely small but actually exist. The back of the cloth is then treated in like manner, beginning with the spraying on of the plasticizer.

The treated cloth is then passed over a hot plate heated by steam to a temperature of around 200° to 250° F. so as to establish throughout the sheet and in the particles of applied thermoplastic material a temperature adequate to cause softening of the plastic in contact with the plasticizer previously applied to the sheet. Under the influence of this warming, adherence of the thermoplastic to the plasticizer-treated sheet is obtained.

The article is then passed between steam heated smoothing rolls, this passage being effected directly after the fabric is withdrawn from the hot plate so that the thermoplastic and plasticizer composition is still in readily yieldable or softened condition. The smoothing causes the impression of part at least of the thermoplastic and plasticizer composition into the face portion of the fabric.

During all this treatment there is no substantial evaporation of the plasticizer and no variation from first to last in its proportion.

That the spaces between the established positions of the thermoplastic material remain permeable may be observed by applying a drop of water to the face or back of the sheet; the moisture quickly appears on the other side of the sheet in spite of the fact that the vinyl resin itself sheds water and in spite of the fact that the sheet when cooled shows such uniform distribution of the vinyl resin throughout the sheet as to give the desired stiffness required for the collar inner liner.

The sheet so made and containing the thermoplastic in plasticized anchored condition on both face and back is then ready for use as the inner liner in three-ply collars.

*Making of plied fabrics*

In forming plied fabric, the inner liner made as described is substituted for the present water-impermeable types of inner liners of collars and formed into an assembly in which collar stock is applied to both face and back of the liner. The consolidation is effected by heat and pressure at the temperature of softening of the plasticized thermoplastic material.

Usual stitching and finishing operations are employed. These are conventional and are not discussed or illustrated in detail. When my collar is subjected to laundering, that portion of the plasticizer which lies between the thermoplastic particles and is not dissolved in the plastic is removed by the water and detergent. The anchorage of the plasticized particles of thermoplastic material is not disturbed. Furthermore there is no migration to any position of evaporation of the plasticizer which, in fact, does not evaporate.

*Making other articles*

In treating other fibrous sheets, the fibrous sheet material selected as the base is substituted for the cloth in the above example. One or both faces of the sheet may be treated with the plasticizer and resin.

Also any of the other combinations of thermoplastic and conventional plasticizer therefor may be substituted for the vinyl resin and plasticizer mixture described above, the process being otherwise as described.

In place of the spraying on of the plasticizer, the plasticizer may be applied to the original fibrous sheet by immersing the sheet in the plasticizer or in a solution thereof and then removing a large part of the absorbed liquid by the process known in the textile industry as padding, the padding giving in effect absorption which may be compared to the removal of excess ink from paper by blotting.

In place of the sifting on of the thermoplastic, the thermoplastic may be applied to the plasticizer treated fibrous sheet by passing the sheet through a chamber in which particles of powdered thermoplastic are kept in suspension as by a slight circulation of air within the chamber.

As an alternative means for causing the excess or unadhered particles of originally applied thermoplastic to fall by gravity from the sheet, there may be used a moderate air blast or other suitable means for removing the unadhered particles after the application of the thermoplastic material to the plasticizer-treated sheet and before the heating step.

When a stretchable fabric is used as the fibrous base to which the treatment is applied, the stretch is retained in large measure in my finished product. Thus, when Lastex fabric is the fibrous base and I apply thereover the plasticizer and then dust on the resin, remove the excess resin, and warm and press as described, the finished product is stretchable in the same direction or directions as was the Lastex originally.

Included within the scope of the invention is the plying together of two or more sheets of fibrous material each treated as described. An open mesh fabric or a lace may be plied with a woven cloth base to give a novel and useful textile. Also there may be disposed between two sheets of fabric, treated as to their inner faces with the plasticizer and thermoplastic, a relatively thick layer of fibrous material, such as used in a quilt or comforter, and the assembly of the two fabrics with the intervening fibers pressed together at intervals, as between heated plates of irregular surfaces, so that the face and back fabrics are adhered together at spaced locations to give machine quilting.

In general, articles made as described are useful when moderate stiffness at least and breathing properties are required. Examples are the use of my treated fabrics in sport shoes, ladies shoes, and men's collars and cuffs.

It will be understood also that it is intended to cover all changes and modifications of the examples of the invention herein chosen for the purpose of illustration which do not constitute departures from the spirit and scope of the invention.

What I claim is:

1. The method of making a stiffened permeable textile sheet product which comprises moistening a surface of the sheet by spraying lightly the surface of the face of the sheet with a normally non-volatile plasticizer in liquid form, applying over the sprayed surface thermoplastic particles that are soluble in the plasticizer and that, in non-plasticized condition and as applied, are non-adherent to each other, removing those of the applied particles which do not adhere to the plasticizer-moistened sheet, and then subjecting the sheet material with the remaining adhered thermoplastic particles to an elevated temperature equal at least to the softening temperature of the thermoplastic particles in contact with the plasticizer, so that the particles in direct contact with the plasticizer soften and become firmly adhered to the surface portions of the sheet material, the article being kept at all times below the temperature of substantial volatilization of the plasticizer, so that evaporation of the plasticizer and attendant migration of the thermoplastic material of the particles are prevented.

2. The method described in claim 1 including applying pressure to the textile sheet and adhered thermoplastic particles at the said elevated temperature, so that the particles in softened condition are forced into the surface portions of the sheet product.

AUGUST F. SCHRAMM, JR.

REFERENCES CITED

The following references are of record in the file of this patent:

UNITED STATES PATENTS

| Number | Name | Date |
|---|---|---|
| 1,995,187 | Lind et al. | Mar. 19, 1935 |
| 2,035,766 | Schramm | Mar. 31, 1936 |
| 2,061,127 | Alvardo et al. | Nov. 17, 1936 |
| 2,167,414 | Billing | July 25, 1939 |
| 2,199,597 | Renfrew et al. | May 7, 1940 |
| 2,230,358 | Mason | Feb. 4, 1941 |
| 2,371,618 | Hanson et al. | Mar. 20, 1945 |